W. H. HOWARD.
FEED-RACK.
No. 191,590. Patented June 5, 1877.
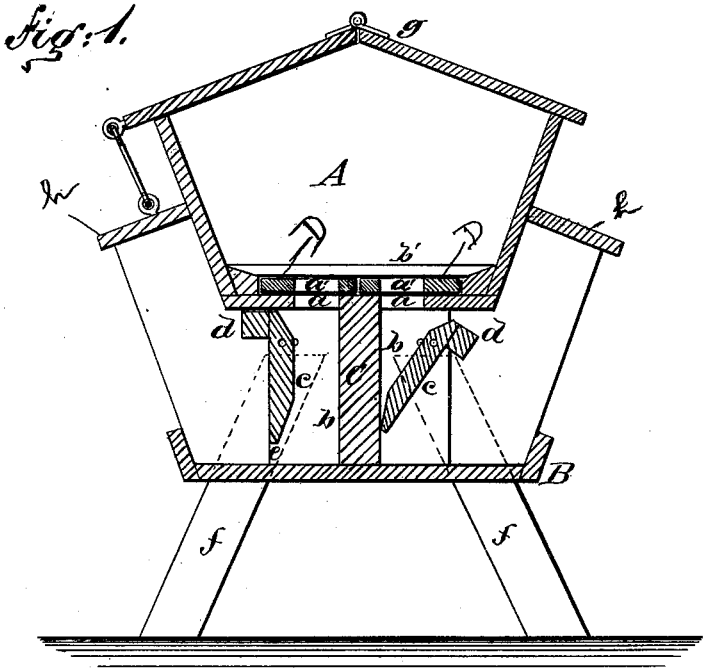
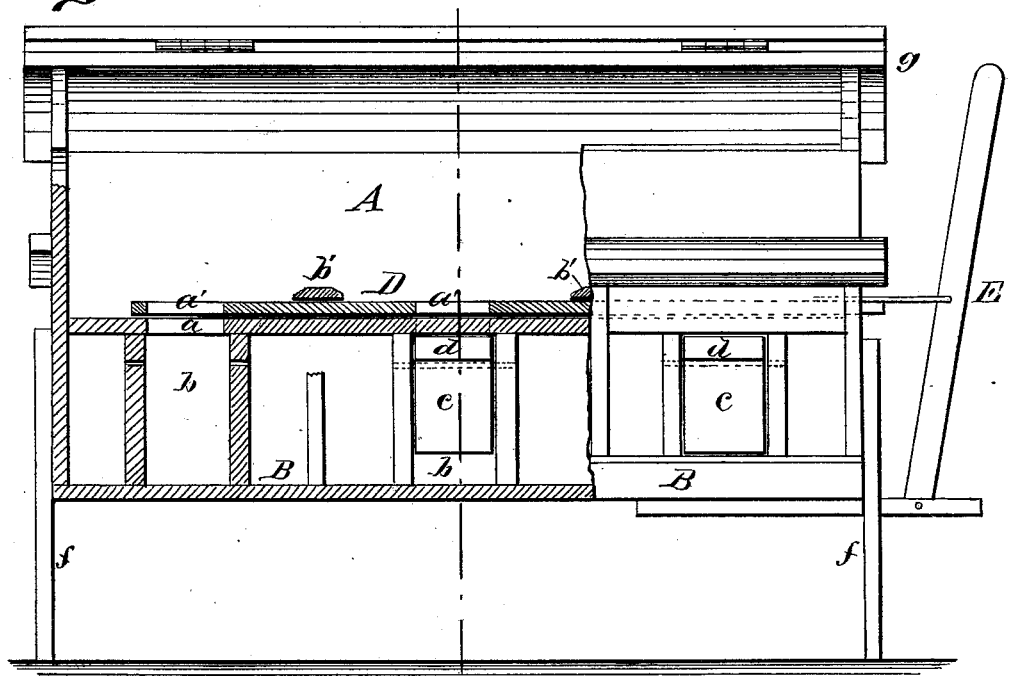
WITNESSES:
Chas. Nida
J. H. Scarborough
INVENTOR:
W. H. Howard
BY
ATTORNEYS.

UNITED STATES PATENT OFFICE.

WILLIAM H. HOWARD, OF ALBANY, WISCONSIN, ASSIGNOR TO HIMSELF, J. F. LACY, AND JONATHAN H. ROBERTS, OF SAME PLACE.

IMPROVEMENT IN FEED-RACKS.

Specification forming part of Letters Patent No. 191,590, dated June 5, 1877; application filed April 2, 1877.

*To all whom it may concern:*

Be it known that I, WILLIAM H. HOWARD, of Albany, in the county of Green and State of Wisconsin, have invented a new and Improved Grain-Ration Feeder for Stock, of which the following is a specification:

Figure 1 is a vertical transverse section on line $x\ x$ in Fig. 2. Fig. 2 is a side elevation in part section.

Similar letters of reference indicate corresponding parts.

The invention is an improvement in the class of devices for feeding stock in which the supply is regulated by sliding or swinging valves. The improvement relates to the specific construction and arrangement of valves with reference to the hopper and feed-trough proper, as hereinafter described and claimed.

In the drawing, A is a hopper for containing grain or other feed, in the bottom of which holes $a$ are made, through which grain may pass to the boxes $b$, that are placed below the hopper in the trough B, upon each side of a central partition, C.

Slides or valves D are placed in the bottom of the hopper A, and in them holes $a'$ are made, which correspond with the holes in the bottom of the hopper. These slides are capable of being moved by levers E, so as to open or close the holes in the bottom of the hopper.

Cross-bars $b'$ extend across the hopper A, above the slides D, and serve the double purpose of keeping the slides in their places and of stirring the grain when the slides are moved.

In each of the boxes $b$ doors $c$ are pivoted, which are capable of turning down into a vertical position with their shoulders $d$ against the bottom of the hopper, or of being inclined so that their lower edges touch the central partition C. These doors are of such width as to leave a space, $e$, between their lower edges and the bottom of the trough B. Extra holes may be made in the sides of the boxes for changing the pivots of the doors, so that the boxes may contain more or less feed.

The entire apparatus is supported at a suitable height by legs $f$ attached to its ends, and the top of the hopper is provided with a cover, $g$, that pitches downward each way from the center. Boards $h$ project from the sides of the hopper, which protect the contents of the trough B from rain or snow.

The slides D are moved by means of the levers E, so as to allow a portion of the grain in the hopper A to pass into the boxes $b$, when they are closed. The animal eats that portion of the grain that is visible in the trough B, and as the grain flows out of the space $e$ below the door $c$, the animal naturally forces the door back until all of the grain let into the box is eaten.

I do not claim a hopper provided with sliding valves operated by levers, nor do I claim, broadly, pivoted swinging or adjustable valves or doors; but,

Having thus described my invention, I claim as new and desire to secure by Letters Patent—

In combination with a supply-hopper, A, having discharge-apertures $a$, and the feed-trough B, having boxes or compartments $b$, the doors or valves $c$, provided with the shoulders $d$, as described, for the purpose of facilitating the feeding of stock, in the manner described.

WILLIAM H. HOWARD.

Witnesses:
    J. B. PERRY,
    W. C. ROBERTS.